United States Patent [19]

Huang

[11] Patent Number: 4,472,801

[45] Date of Patent: Sep. 18, 1984

[54] DISTRIBUTED PRIORITIZED CONCENTRATOR

[75] Inventor: Alan Huang, Ocean, N.J.

[73] Assignee: AT&T Bell Laboratories, Murray Hill, N.J.

[21] Appl. No.: 479,858

[22] Filed: Mar. 28, 1983

[51] Int. Cl.$^3$ ............................................. H04Q 11/04
[52] U.S. Cl. ........................................ 370/56; 370/60; 179/18 FC
[58] Field of Search ............................ 370/56, 60, 94; 340/825.5, 825.51; 179/18 FC

[56] References Cited

U.S. PATENT DOCUMENTS 3,428,946  2/1969  Batcher ............................ 340/146.2

FOREIGN PATENT DOCUMENTS 2497041  6/1982  France .................................. 370/94

OTHER PUBLICATIONS

Spring Joint Computer Conference Proceedings, 1968 "Sorting Networks and Their Applications", K. E. Batcher, pp. 307–314.

*Primary Examiner*—Douglas W. Olms
*Attorney, Agent, or Firm*—H. T. Brendzel

[57] ABSTRACT

Disclosed is a distributed prioritized concentrator that manages the flow of information through high data rate communications paths. The concentrator accumulates incoming packets as necesary, sorts the accumulated packets in parallel based on the relative priority of the packets, and transmits as many of its highest priority packets as there are available communication channels. In its simplest form the prioritized concentrator comprises a parallel sorting network having some of its inputs connected to accept incoming signal packets and the remaining ones of its inputs connected to outputs of delay elements. A number of the highest priority sorting network outputs are connected to outgoing communication channels, a number of lower priority sorting network outputs are connected to inputs of the delay elements and the remaining number of lowest priority sorting network outputs are left unconnected. More sophisticated forms which add various capabilities are also disclosed.

9 Claims, 2 Drawing Figures

DISTRIBUTED PRIORITIZED CONCENTRATOR

1. Field of the Invention

This invention relates to wideband switching systems and, more specifically, to means for effectively managing communication lines based on the priority of the flowing information.

BACKGROUND OF THE INVENTION

With the burgeoning of electronic technologies, the demand for a wider variety of communications services has been steadily rising. New technologies have been continually developing to meet these demands including lasers, fiber optics, microprocessors, and very large scale integrated circuits. While many alternative approaches for realizing the new communications services are available, digital data transmission seems to be the one best equipped for future progress and, accordingly, digital transmission is currently receiving the most attention.

In terms of the services to be offered, it is expected that, in addition to standard telephone services, a host of low, medium and wide bandwidth services would be introduced. This would include electronic mail, facsimile, high-fidelity audio, computerized data base searches (e.g., want ads, encyclopedia, travel arrangements, etc.), remote shopping, electronic banking and home computer networks. Business users would also use electronic blackboards, teleconference facilities, word processors, and large computer communication networks.

In one copending application, entitled "A Self Routing Switching Network", filed concurrently herewith, S. Knauer and I disclosed a wideband self-routing switch for simultaneously switching a plurality of incoming signals. We described specific embodiments that switch signal packets with the aid of sorting networks and have shown that a wideband switch, which can grow modularly, is very useful.

In a second copending application, entitled "A Wideband Digital Switching Network", also filed concurrently herewith, we enhanced the wideband switch and disclosed a switching network that can offer one-to-one, one-to-many, and many-to-many types of communications, making it feasible to offer the wideband services described above by treating each such switching network as a self contained central office or a "star". What remains, then, is to interconnect the central offices or the stars in the most efficient manner.

A number of approaches are employed in the prior art to manage the communication interconnections between stars. One approach uses high capacity lines to interconnect stars, but this is inefficient because most of the time some capacity is idle. The inefficiency is reduced in a variation on this approach which switches the information onto a small number of lines, taking advantage of the fact that not all of the lines are active simultaneously. This is the classic concentration function. It improves the utilization of the communication paths at the cost of possible blocking of signals.

To reduce blocking of particularly vital signals, a third approach employs a computer to sequentially examine incoming lines, store the applied signal packets in a prioritized queue in the computer's memory and transmit the highest priority packets to its outgoing lines, as they become available. The difficulty with this approach is that a statistical multiplexer must scan the input, properly queue the data, and manage the outgoing lines in essentially a simultaneous manner. This becomes more and more difficult as the data rate increases or the number of incoming and outgoing lines increases. With present technology, the sequential nature of the computer approach cannot meet the demands imposed by the parallelism and consequent high "throughput" rates of the switching network we disclosed.

SUMMARY OF THE INVENTION

To provide interconnection managing means for the high data rates of our switching network that effectively utilizes the available bandwidth of the communications paths among stars, I have invented a distributed prioritized concentrator. This concentrator accumulates incoming packets as necessary, sorts the accumulated packets in parallel based on the relative priority of the packets, and transmits as many of its highest priority packets to the next star as there are communication channels to that star.

In its simplest form the prioritized concentrator comprises a parallel sorting network having some of its inputs connected to output ports of a star and the remaining ones of its inputs connected to outputs of delay elements. A number of sorting network outputs are connected to communication channels leading to another star and another number of sorting network outputs are connected to inputs of the delay elements. More sophisticated forms which add various capabilities are, of course, possible and some of these capabilities are incorporated in this disclosure.

DETAILED DESCRIPTION

The following description of the prioritized concentrator is presented in the context of the above mentioned wideband self-routing switching network disclosed in the priorly identified copending applications.

In those applications, the described wideband switching network embodiment switches signal packets of a particular packet format, but any signal format having an accompanying destination address can be employed. The same generalization applies here and the same illustrative signal format is employed. That is, the signals described below flow in packets which contain a header field and a data field. The header field contains an activity bit (indicating whether the packet contains a valid signal -"0"-, or no signal -"1 ") and an address field including a destination address subfield and possibly additional subfields, with the most significant bit residing in first bit position of each subfield. For purposes of the prioritized concentrator disclosed herein a priority subfield is included in the header which specifies the packet's priority. Also for purposes of this disclosure, it is assumed that the priority subfield resides at, or has been moved to, the beginning of the header, immediately following the activity bit. I have selected a high binary number in the priority subfield to represent high priority and, conversely, a low binary number to represent low priority.

Figure 1:
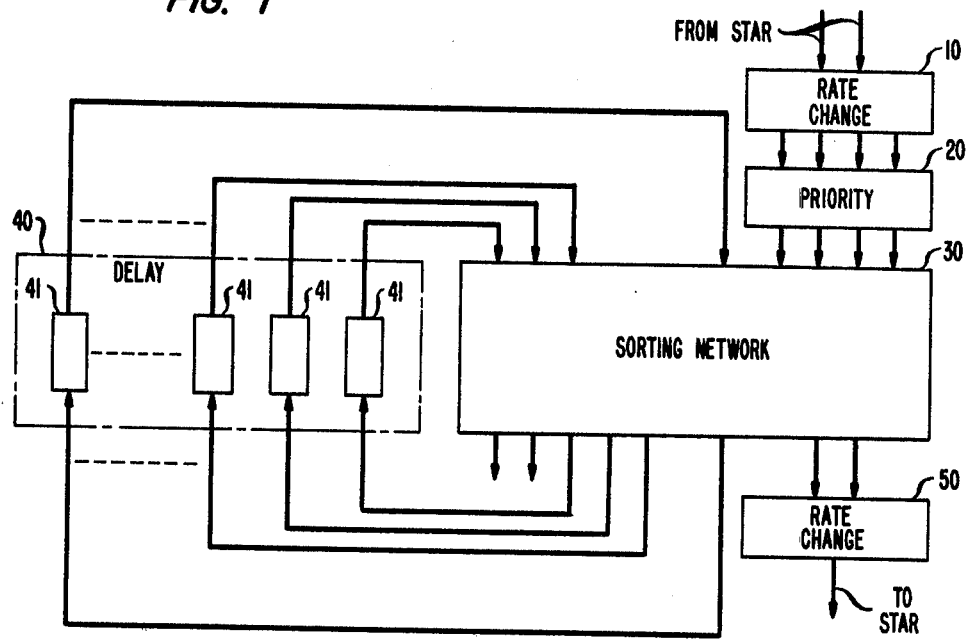
FIG. 1 depicts a block diagram of a generalized distributed prioritized concentrator operating in accordance with the principles of my invention.

FIG. 1 presents a block diagram of a distributed prioritized concentrator embodying the principles of my invention. Sorting network 30 has a number of its inputs connected to a priority designation block 20 and the remaining ones of its inputs connected to outputs of a delay network 40. The inputs of priority designation block 20 are derived from the concentrator's input ports via a rate changing block 10. Priority designation block 20 assigns priorities to incoming packets when the concentrator interconnects stars that do not assign packet priorities elsewhere. Rate changing block 10, as discussed below, is either a multiplexer or a demultiplexer, depending on the signal rates within and outside the concentrator. In some applications, neither block 10 nor block 20 would be required for the proper operation of the FIG. 1 concentrator.

Sorting network 30, whose output terminals are uniquely designated 0 through $N-1$ (starting with the left-most terminal in FIG. 1), sorts the packets applied to its input terminals based on the priority of the packets as specified in the priority subfield. That is, sorting network 30 routes the applied signal packets so that a packet at output terminal M has a priority equal to or lower than the priority of a packet at output terminal $M-1$, and a priority equal to or higher than the priority of a packet at output terminal $M+1$. Thus, the left-most output terminal of sorting network 30 in FIG. 1 receives the packet having the lowest priority.

As shown in FIG. 1, a number of the highest designated output terminals of sorting network 30 are connected to a rate changing block 50 through which they are transmitted to the next star. Rate changing block 50, like block 10, is either a multiplexer or a demultiplexer depending on the relative data rates of the distributed prioritized concentrator and the outgoing lines. It, too, may not be necessary in some applications.

Most of the remaining packets at the output terminals of sorting network 30, having lower priorities and appearing at network 30 output terminals having lower designations, are applied to delay network 40 and are fed back to sorting network 30 input terminals. Each input in delay network 40 has a corresponding output in network 40, to which it is connected via a shift register 41. Each shift register 41 contains sufficient storage so that, in combination with the storage inherent in sorting network 30, exactly one packet is stored. This provides the appropriate feedback delay between the input to network 30, through delay network 40, and back to the input of network 30.

When network 30 has an equal number of input and output terminals, a number of sorting network 30 output terminals with the lowest designations are left unconnected and packets appearing at these terminals are lost. These packets are, in effect, overflow packets. Thus, at each iteration of sorting network 30 (at whatever iteration rate that is suitable for network 30), the current highest priority packets are transmitted to the next star, most of the other packets are fed back to the input, and overflow packets, if any, are discarded.

The number of inputs and outputs of the concentrator, the incoming and outgoing packet rate and the iteration rate of sorting network 30 are all interrelated in a manner that may be appreciated from the discussion below. It yields a great deal of flexibility to my prioritized concentrator.

When the iteration rate of sorting network 30 is B and packets applied to the prioritized concentrator arrive on $m_1$ lines at rate $n_1B$, block 10 is a demultiplexer which converts $m_1$ lines at rate $n_1B$ to $m_1n_1$ lines at rate B. Similarly, when outgoing packets leave the prioritized concentrator on $m_2$ lines at rate $n_2B$, block 50 is a multiplexer which converts $m_2n_2$ lines at rate B to $m_2$ lines at rate $n_2B$. Of course, $m_2$ is smaller than $m_1$ for, otherwise, there would be no need for a concentrator.

The $m_1n_1$ outputs of block 10 are connected through block 20 to the input terminals of sorting network 30. Therefore, when network 30 has N inputs, $N-m_1n_1$ input terminals of network 30 are available to be connected to output terminals of delay network 40.

On the output side of sorting network 30, the $m_2n_2$ highest designation output terminals (carrying highest priority packets) are connected to rate changing block 50, the next $N-m_1n_1$ highest designation output terminals are connected to delay network 40, and the remaining $N-(m_1n_1+m_2n_2)$ output terminals of network 30 are left unconnected.

From the above it may be observed that the size of sorting network 30, N, is the user's choice, as long as it is larger than $m_1n_1+m_2n_2$. Larger values of N, with the associated larger memories contained in delay network 40, permit keeping a larger number of low priority packets before they are either transmitted or discarded via the unconnected output terminals of sorting network 30. It may also be observed that the prioritized concentrator can easily serve as a buffer between stars that operate at different rates and, furthermore, that this ability is not dependent on any particular iteration rate within the prioritized concentrator.

Priority designation block 20 is shown in FIG. 1 following rate changing block 10, but it can precede it. Its implementation depends, of course, on the particular scheme selected for assigning priorities. One scheme may simply comprise a "time stamp" that is applied to each incoming packet. To implement such a scheme, block 20 includes a digital clock and a register to connect each input line of block 20 to a corresponding output line of block 20. The size of each register equals the length of the priority subfield and, at the proper time, when the priority subfields of the packets traversing block 20 are in the registers, the clock time is inserted into the registers.

With respect to assigning priority to inactive packets which, of course, carry no information, the inverse of the activity bit may be used as part of the priority subfield. Active packet with activity bit "0" would automatically get a higher priority than inactive packets with activity bit "1". Alternatively, block 20 could detect empty packets (whatever their characteristics happen to be) and assign the lowest priority to those packets.

Implementation of the various other blocks of FIG. 1 may follow conventional design. For example, block 10 and 50 may be implemented with data selectors (e.g., TTL logic 74150 ICs), data distributors (e.g., 74154 ICs), and shift registers in a straight forward manner. Sorting network 30 may be implemented as taught by K. E. Batcher in "Sorting Networks and Their Applications", Spring Joint Computer Conference Proceedings, 1968, pages 307 et seq.

The structure of sorting network 30 is matrix like, with rows and columns and with a number of elements in each row, N, being equal to the number of input terminals of the network, and a number of rows that is monotonically increasing with N. Hence, the number of switching elements in network 30 is N times the number of rows.

Figure 2:
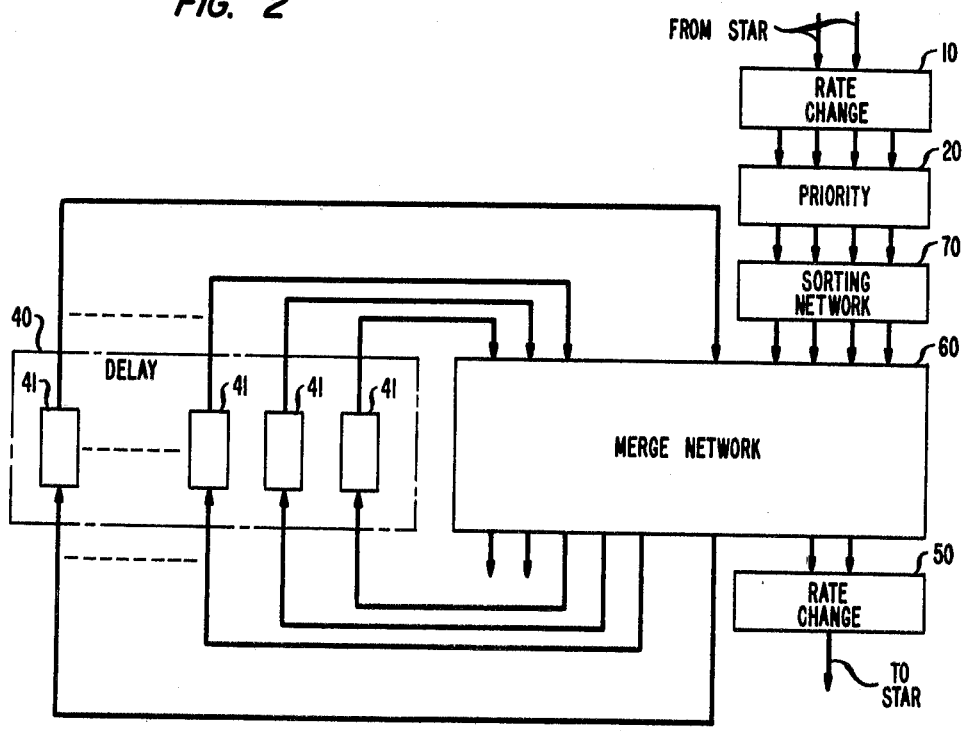
FIG. 2 depicts a block diagram of a distributed prioritized concentrator which utilizes a sort and a merge network in place of sorting network 30 in the FIG. 1 system.

The required number of switching elements can be reduced substantially when it is realized that the packets entering sorting network 30 from delay network 40 are already sorted. Capitalizing on this reduced entropy, sorting network 30 of FIG. 1 can be replaced with a much smaller sorting network that is followed by a simpler merge network. As shown in FIG. 2, sorting network 30 is replaced with a sorting network 70 that sorts only the $m_1n_1$ lines of block 20 (where $m_1n_1 < < N$) and a merge network 60 that merges the output signals of sorting network 70 and of delay network 40. Network 60 is of width N but requires many fewer switching elements than a sorting network of the same width because its two input sets are already sorted. Implementation of merge network 60 can follow any one of standard approaches. One approach is described by Batcher in the aforementioned publication.

What is claimed is:

1. A prioritized concentrator having input and output ports comprising:
    sorting means having input ports and ordered output ports, for sorting signal packets applied to said sorting means input ports in accordance with a priority field accompanying said signal packets, to cause signal packets with successively higher priority to be connected to successively higher order output ports of said sorting means, said sorting means having a number of its input ports connected to said concentrator input ports and another number of its output ports connected to said concentrator output ports; and
    delay means having input terminals and output terminals, with its input terminals connected to remaining ones of said sorting means output ports and its output terminals connected to remaining ones of said sorting means input ports.

2. A prioritized concentrator having input and output lines comprising:
    means for sorting signal packets applied to said input lines in accordance with a priority field accompanying said signal packets, said sorting means having input and output ports, said sorting means causing signals with successively higher priority to be connected to successively higher order output ports, and said sorting means having a number of its input ports connected to said concentrator input lines and another number of its output ports connected to said concentrator output lines;
    delay network means having input terminals and output terminals; and
    connecting means for connecting said delay network means input terminals to some of the remaining ones of said sorting means output ports and said delay network output terminals to remaining ones of said sorting means input ports.

3. A prioritized concentrator in accordance with claim 2 wherein said sorting means comprises a sorting network having input ports and said connecting means connects said delay network output terminals to said sorting network input ports.

4. A prioritized concentrator in accordance with claim 2 wherein said soorting means comprises a sorting network having input and output ports and a merge network having input and output ports, said sorting network output ports being connected to certain of said merge network input ports and said connecting means connecting said delay network output terminals to other of said merge network input ports.

5. A prioritized concentrator in accordance with claim 2 wherein said delay network means comprises a plurality of delay means, each of said delay means connecting an input terminal of said delay network means to an output terminal of said delay network means.

6. A prioritized concentrator in accordance with claim 1 wherein the number of said sorting means output ports is smaller than the number of said sorting means input ports.

7. A prioritized concentrator in accordance with claim 2 further comprising first multiplexing means connected to each of said concentrator input lines for changing the rate of time division multiplexed signal packets on said input lines before applying them to said sorting means input ports; and
    second multiplexing means connected to said another number of said storing means output ports for changing the rate of time division multipleded signal packets on said another number of said output ports before applying them to said concentrator output lines.

8. A prioritized concentrator in accordance with claim 2 wherein the number of said sorting means input ports connected to said concentrator input lines is larger than said another number of said output ports connected to said concentrator output lines.

9. A prioritized concentrator in accordance with claim 2 further comprising a priority controlling circuit interposed between said concentrator input lines and said sorting means input ports connected to said concentrator input lines.

* * * * *